(12) United States Patent
Yahaya et al.

(10) Patent No.: US 9,962,646 B2
(45) Date of Patent: May 8, 2018

(54) SOUR GAS FEED SEPARATIONS AND HELIUM RECOVERY FROM NATURAL GAS USING BLOCK CO-POLYIMIDE MEMBRANES

(71) Applicant: Saudi Arabian Oil Company, Dhahran (SA)

(72) Inventors: Garba Oloriegbe Yahaya, Dhahran (SA); Ahmad A. Bahamdan, Dhahran (SA); Mohammad S. Al-Qahtani, Dhahran (SA); Feras Hamad, Dhahran (SA); Ahmed Ameen, Dhahran (SA); Abdulaziz Yousef Al-Ammar, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 188 days.

(21) Appl. No.: 14/987,547

(22) Filed: Jan. 4, 2016

(65) Prior Publication Data

US 2017/0189850 A1    Jul. 6, 2017

(51) Int. Cl.
*B01D 53/22* (2006.01)
*B01D 67/00* (2006.01)
(Continued)

(52) U.S. Cl.
CPC ......... *B01D 53/228* (2013.01); *B01D 67/002* (2013.01); *B01D 67/0009* (2013.01);
(Continued)

(58) Field of Classification Search
CPC ................ B01D 71/64; B01D 2257/11; B01D 2257/304; B01D 2256/18;
(Continued)

(56) References Cited

U.S. PATENT DOCUMENTS

| 3,246,449 A | 4/1966 | Stern |
| 4,705,540 A | 11/1987 | Hayes |

(Continued)

FOREIGN PATENT DOCUMENTS

| DE | 102005008597 A1 | 8/2006 |
| EP | 0407172 A1 | 1/1991 |

(Continued)

OTHER PUBLICATIONS

L. White, Properties of a Polyimide Gas Separation Membrane in Natural Gas Stream, Journal of Membrane Science 101 (1995) pp. 73-82.

(Continued)

*Primary Examiner* — Anthony Shumate
(74) *Attorney, Agent, or Firm* — Bracewell LLP; Constance G. Rhebergen; Kevin R. Tamm (57) ABSTRACT

Compositions of and methods for separating components of a natural gas stream are disclosed. In one embodiment, the method includes receiving an inlet stream comprising natural gas, the inlet stream having an inlet pressure, and the inlet stream further comprising methane, helium, and an impurity. The method includes allowing the inlet stream to contact a block co-polyimide membrane, the block co-polyimide membrane exhibiting both higher permeability for and higher selectivity for the helium and the impurity than for the methane at the inlet pressure of the inlet stream and separating the methane from the helium and the impurity to create a retentate stream, the retentate stream comprising an increased concentration of methane relative to the inlet stream. The method also includes creating a permeate stream comprising the helium and the impurity at an increased concentration of helium and impurity relative to a concentration of helium and impurity in the inlet stream.

24 Claims, 5 Drawing Sheets

(51) Int. Cl.

| | | |
|---|---|---|
| B01D 71/64 | (2006.01) | |
| B01D 71/80 | (2006.01) | |
| C10L 3/10 | (2006.01) | |
| C08G 73/10 | (2006.01) | |
| B01D 69/02 | (2006.01) | |

(52) U.S. Cl.
CPC ......... *B01D 67/0093* (2013.01); *B01D 69/02* (2013.01); *B01D 71/64* (2013.01); *B01D 71/80* (2013.01); *C08G 73/1007* (2013.01); *C10L 3/10* (2013.01); *C10L 3/103* (2013.01); *C10L 3/104* (2013.01); *C10L 3/105* (2013.01); *B01D 2256/18* (2013.01); *B01D 2256/245* (2013.01); *B01D 2257/11* (2013.01); *B01D 2257/304* (2013.01); *B01D 2257/504* (2013.01); *B01D 2325/20* (2013.01); *C10L 2290/548* (2013.01); *C10L 2290/58* (2013.01)

(58) Field of Classification Search
CPC ........ B01D 2256/245; B01D 2257/504; B01D 67/0093; B01D 53/228; B01D 67/002; B01D 2325/20; B01D 71/80; B01D 53/22; C10L 3/103; C10L 3/105; C10L 3/104; C10L 3/10; C10L 2290/58; C10L 2290/548; C08G 73/1007
See application file for complete search history.

(56) References Cited

U.S. PATENT DOCUMENTS

| | | | |
|---|---|---|---|
| 4,717,407 A | 1/1988 | Choe | |
| 4,880,442 A | 11/1989 | Hayes | |
| 4,952,220 A | 8/1990 | Langsam | |
| 4,954,144 A | 9/1990 | Burgoyne | |
| 5,042,992 A | 8/1991 | Blinka | |
| 5,045,093 A * | 9/1991 | Meier | B01D 67/0093 95/47 |
| 5,055,116 A | 10/1991 | Kohn | |
| 5,165,963 A | 11/1992 | Matsumoto | |
| 5,178,940 A | 1/1993 | Matsumoto | |
| 5,202,411 A | 4/1993 | Itatani | |
| 5,234,471 A | 8/1993 | Weinberg | |
| 5,262,056 A * | 11/1993 | Koros | B01D 71/56 210/500.33 |
| 5,286,539 A * | 2/1994 | Kusuki | B01D 71/64 210/500.1 |
| 5,318,116 A | 6/1994 | Vinegar | |
| 5,391,219 A | 2/1995 | Matsumoto | |
| 5,425,801 A * | 6/1995 | Prasad | B01D 53/22 95/15 |
| 5,558,698 A * | 9/1996 | Baker | B01D 53/22 423/229 |
| 5,591,250 A | 1/1997 | Stern | |
| 5,702,503 A * | 12/1997 | Tse Tang | B01D 53/228 427/434.3 |
| 5,725,633 A | 3/1998 | Ozcayir | |
| 5,817,165 A | 10/1998 | Hachisuka | |
| 6,383,258 B1 | 5/2002 | Simmons | |
| 6,565,626 B1 | 5/2003 | Baker | |
| 6,709,491 B2 | 3/2004 | Kawakami | |
| 6,790,263 B1 | 9/2004 | Ding | |
| 8,614,288 B2 | 12/2013 | Liu | |
| 2005/0217479 A1 | 10/2005 | Hale | |
| 2010/0186586 A1 * | 7/2010 | Chinn | B01D 53/22 95/45 |
| 2012/0283407 A1 * | 11/2012 | Hoppin | C07D 245/04 528/337 |
| 2014/0137735 A1 | 5/2014 | Bhandari | |
| 2014/0243574 A1 | 8/2014 | Karode | |
| 2015/0045481 A1 * | 2/2015 | Kim | C07C 217/90 524/104 |
| 2015/0353686 A1 * | 12/2015 | Lee | B01D 71/64 525/435 |
| 2016/0185909 A1 * | 6/2016 | Bara | C08G 73/1085 95/44 |
| 2016/0199791 A1 * | 7/2016 | Benes | B01D 53/228 95/51 |
| 2016/0317981 A1 * | 11/2016 | Ungerank | B01D 53/228 |
| 2017/0120200 A1 * | 5/2017 | Lee | B01D 53/228 |

FOREIGN PATENT DOCUMENTS

| | | | |
|---|---|---|---|
| EP | 0627257 | A1 | 12/1994 |
| EP | 0811421 | A1 | 12/1997 |
| EP | 2471592 | A1 | 7/2012 |
| WO | 9220431 | A1 | 11/1992 |
| WO | 2015091122 | A1 | 6/2015 |

OTHER PUBLICATIONS

I. Tanis, A Comparison of Homopolymer and Block Copolymer Structure in 6FDA-based Polyimides, Phys. Chem. Chem. Phys. 2014, 16, 23044.

M. Aksari, Natural Gas Purification and Olefin/Paraffin Separation Using Cross-Linkable 6FDA-Durene/DABA Co-polyimides Grafted with α, β, and γ-Cyclodextrin, Journal of Membrane Science, 390-391 (2012) pp. 141-151.

T.H. Kim, Relationship Between Gas Separation Properties and Chemical Structure in a Series of Aromatic Polyimides, Journal of Membrane Science, 37 (1988) pp. 45-62.

M. Cecopieri-Gomez, On the Limits of Gas Separation in CO2/CH4, N2/CH4 and CO2/N2 Binary Mixtures Using Polyimide Membranes, Journal of Membrane Science, 293 (2007) pp. 53-65.

B. Kraftschik, Dense Film Polyimide Membranes for Aggressive Sour Gas Feed Separations, Journal of Membrane Science, 428 (2013) pp. 608-619.

G. Chatterjee, Poly(ether urethane) and poly (ether urethane urea) Membranes With High H25/CH4 Selectivity, Journal of Membrane Science, 135 (1997), pp. 99-106.

C. Achoundong, Silane Modification of Cellulose Acetate Dense Films as Materials for Acid Gas Removal, Macromolecules, 2013, 46, 5585-5594.

T. Mohammadi, Acid Gas Permeation Behavior Through Poly (Ester Urethane Urea) Membrane, Ind. Eng. Chem. Res. 2008, 47, pp. 7361-7367.

The International Search Report and Writtne Opinion for related PCT application PCT/US2017/012136 dated May 8, 2017.

Heck et al., "Block copolyimide membranes for pure- and mixed-gas separation", Separation and Purification Technology, 2016, pp. 183-192, vol. 173, Elsevier.

Niwa et al., "Preparation of Novel Fluorinated Block Copolyimide Membranes for Gas Separation", Journal of Applied Polymer Science, 2006, pp. 2436-2442, vol. 100, Wiley Periodicals Inc.

Yahaya et al., "Aromatic block co-polyimide membranes for sour gas feed separations", Chemical Engineering Journal, 2016, pp. 1020-1030, vol. 304, Elsevier.

* cited by examiner

SOUR GAS FEED SEPARATIONS AND HELIUM RECOVERY FROM NATURAL GAS USING BLOCK CO-POLYIMIDE MEMBRANES

BACKGROUND

Field

Embodiments of the disclosure relate to gas component separations using polymer membranes. In particular, embodiments of the disclosure relate to compositions of and methods for using block co-polyimide membranes with high gas permeability and selectivity for separating components of natural gas.

Description of the Related Art

Worldwide demand for natural gas has increased over the past several decades, as it is a cleaner and more efficient fuel than certain other hydrocarbons, such as coal. This trend is expected to continue as traditional liquid fossil fuel reserves become depleted and concerns about carbon dioxide ($CO_2$) emissions from coal combustion grow. Since raw natural gas from various origins is different in composition, the potential growth in the demand for methane ($CH_4$) requires separation technologies with increased efficiency. Various impurities exist in raw natural gas, and sub-quality "sour gas" containing high levels of these components must be upgraded to meet pipeline specifications and environmental limitations.

Although methane constitutes the key component of natural gas, it may also contain considerable amounts of impurities including water, carbon dioxide ($CO_2$), nitrogen ($N_2$), hydrogen sulfide ($H_2S$), and other hydrocarbons. In current systems, natural gas treatment involves the removal of acid gases, such as $CO_2$ and $H_2S$, before natural gas is delivered to pipelines. At high concentrations, acid gases can corrode transportation pipelines and create numerous other detrimental effects. Moreover, $H_2S$ is extremely toxic, and its combustion produces harmful sulfur dioxide ($SO_2$) gas. Sweetening of natural gas, therefore, is necessary to reduce pipeline corrosion, prevent atmospheric pollution, increase the fuel heating value of the gas, and decrease the volume of gas to be transported.

Current natural gas treatment includes many industrial gas separation processes. Absorption of acid gases in basic solvents, such as liquid amines and hot aqueous potassium carbonate solutions, and pressure swing adsorption (PSA), are examples of natural gas purification technologies. A number of drawbacks to these processes exist, as they rely upon energy-intensive thermal regeneration steps, large environmental footprints, heavy maintenance requirements, and high capital costs. As such, membrane-based separations and hybrid absorption-membrane processes have received much attention recently due to advantages in energy efficiency, process footprint, operational flexibility, and reduced environmental impact. Limited data have been reported on the development of membrane materials for aggressive sour gas separations, such as, studies on $H_2S/CH_4$ separation performance using rubbery membranes. Adequate performance has been found in some studies. However, since rubbery materials separate based on solubility selectivity, the $CO_2/CH_4$ separation efficiency of these rubbery polymers tends to fall significantly below glassy polymers such as cellulose acetate (CA) and polyimides, which separate molecules primarily based on size.

A variety of processes and techniques have been developed to separate and recover helium from multicomponent gas streams. Such processes include stand-alone membrane units, stand-alone cryogenic units, and combinations of membrane units and PSA units. Stand-alone cryogenic processes have been used to produce crude helium at high recovery rates from natural gas and other streams containing low purity helium. When the concentration of helium in the feed drops to low levels, for example below about 1 mol % concentration, processes using stand-alone cryogenic units become impractical. Helium is typically present in natural gas at below 0.5 mol % concentration levels and is mostly extracted as crude helium across liquid natural gas (LNG) trains. World demand for helium is increasing, and this is expected to put pressure on production facilities as demand for high-purity helium products begins to outstrip supply. In light of these trends, processing methods that overcome the impracticality of the classical processes described above are needed. Separation of helium from natural gas using high-performance membranes or a combination of membranes with any of the other classical processes described can improve the economics of helium recovery.

Glassy polyimides constitute a large portion of recent high-performance membrane materials for acid gas separations and helium recovery from natural gas. These materials exhibit high-glass transition temperatures ($T_g$) ($T_g$ greater than about 200° C.) and are relatively hydrophobic. The majority of glassy polyimide acid gas and helium removal capacity is derived from size selectivity. For acid gas separations, these materials frequently give superior efficiency, productivity, and resistance to penetrant-induced plasticization compared to cellulose acetate (CA), which is presently the industrial standard membrane material for $CO_2$ separations.

SUMMARY

Applicant has recognized that there is a need for efficient compositions and methods for gas component separation of and helium recovery from raw natural gas, such as, for example, in sour gas separations. Embodiments of the disclosure relate to gas component separations using block co-polymer membranes. In particular, embodiments of the disclosure relate to compositions of and methods for using block co-polyimide membranes for separating components of natural gas with high gas permeability and selectivity.

In order to produce less rigid polymers that are mechanically workable as membranes and have improved block co-polyimide membrane performance, chemical modifications that include bromination of synthesized co-polyimides and modification with other suitable reagents, such as bulky diamine groups including 9,9-bis(4-aminophenyl)fluorine (also known as CARDO); 9,9-bis(4-aminophenyl-3-isopropyl-5-methyl-phenyl)fluorine (also known as CARDOS); and 4,4'-methylene bis(2,6-diisopropylaniline) (also known as MDIPA), are disclosed, in certain embodiments.

These modification steps are unique and significantly improve the performance of co-polyimide gas component separations. Without being bound to any theory or principle, it is believed that the improved gas separations disclosed herein are achieved, in part, due to inhibition in polymer chain packing provided by bulky groups which increase inter-chain spacing. These bulky groups allow for faster transport and do not greatly diminish the ability of 6FDA-mPDA sections to discriminate gases based on their size. 6-FDA represents 2,2'-bis-(3,4-dicarboxyphenyl) hexafluoropropane dianhydride and mPDA represents 1,3-phenylenediamine. Therefore, compositions can be produced with a good balance between the distribution of free volume generated by $CH_3$ moieties of durene diamine and good packing induced by mPDA moieties.

Currently, limited data have been reported on the development of membrane materials for aggressive sour gas separations. Embodiments of the present disclosure exhibit advantages over commercially available membranes, as aromatic block co-polyimides disclosed here give superior selectivity, permeability, and resistance to penetrant-induced plasticization compared to cellulose acetate (CA), which is presently the industrial standard membrane material for $CO_2$ separations. Aromatic polyimides of the present disclosure exhibit properties such as high thermal stability, chemical resistance, and mechanical strength.

These polymer properties help a co-polyimide membrane structure to withstand deterioration due to the wet conditions often found with natural gas streams. This is evident from the results obtained in the disclosure, as co-polyimides exhibit $H_2S/CH_4$ and $CO_2/CH_4$ selectivities of about 23 and 27, respectively, at a moderate feed pressure of 500 psia and 20 vol. % concentration $H_2S$ in a feed gas mixture. Such results are superior to those obtained in current commercial membranes. Moreover, the $CO_2/CH_4$ and $H_2S/CH_4$ selectivities of the co-polyimides do not degrade to the same extent as was reported for CA and other commercial membranes, even under much more aggressive conditions. The stability exhibited by embodiments of membranes of the present disclosure at moderate pressures and high $H_2S$ concentrations is surprising and unexpected, because literature reports focus only on low $H_2S$ concentrations and low pressures. An additional surprising and unexpected result obtained is that the co-polyimide of the present disclosure is not only acid gas selective, but also more selective to $N_2$ as compare to $CH_4$ (in other words, the permeation of $N_2$ in aromatic polyimides is higher than $CH_4$). This is advantageous, and energy is being saved as the membrane simultaneously permeates both acid gas and $N_2$, while keeping $CH_4$ in a high pressure retentate.

Among the polymers for gas separation membranes, aromatic polyimides provide advantages such as high thermal stability, chemical resistance, and mechanical strength. Natural gas is typically processed at high pressures (more than 800 psi) and can be saturated with higher hydrocarbons ($C_3+$) and water vapor. Membranes made from polyimides disclosed here show advantageous performance, especially high selectivities for $CO_2/CH_4$ separation. In some embodiments of hexafluorodianhydride (6-FDA) based polyimides, the substitution of $CH_3$ groups by $CF_3$ groups increases the stiffness of the chain, allowing the membrane to separate molecules on the basis of steric hindrance more effectively. Chain packing is inhibited by the large $CF_3$ groups leading to an increase in permeability. In addition, the imposed restriction of the intrasegmental mobility limits the distribution of gap sizes that are responsible for penetrant diffusion, thereby increasing diffusivity selectivity. Therefore, 6-FDA-based polyimides deviate from the general relationship between permeability and perm-selectivity by showing systematically greater selectivities at values of permeability equivalent to other polymers.

Furthermore, copolymerization is one of the approaches to further improve the gas separation performance for polymeric materials. In some instances, copolymerization may potentially combine the advantages of the base polymers and eliminate their deficiencies. Co-polyimides offer the possibility of preparing membranes with gas permeabilities and selectivities not obtainable with homo-polyimides. The properties of co-polyimides can be adjusted by the variation of the ratio of the co-monomers. In the case of block co-polymers, the properties can also be adjusted by the variation of the length and the ratio of the different blocks. These variations can lead to a significant improvement of gas separation properties of the resulting co-polyimides without the need of heavy and costly synthetic modifications.

A high block length and a high ratio of different blocks in co-polyimides can greatly diminish selectivity in some embodiments. However, permeability is much higher for higher block length co-polyimides (such as, for example, (15000/15000)) than for lower block length polymers (such as, for example, (5000/5000)). In the case of big blocks, only relatively few of each block can be incorporated in one polymer chain, and thus the excess disrupt polymer chain packing in the membrane creating domains containing mostly 6FDA-mPDA and others containing mostly 6FDA-durene. $CH_3$ moieties of durene diamine increase inter-chain spacing thus diminishing the membrane's ability at discriminating gases (selectivity) in a way that normally cannot be compensated by mPDA moieties.

However, in the case of small length blocks, such as, for example, (5000/5000), the blocks are small enough for the main polymer chain to organize in a way that the resulting membrane benefits from the properties of the parent homopolymers. The increase in inter-chain spacing allowing for faster transport does not diminish greatly the ability of 6FDA-mPDA sections to discriminate gases based on their size. This results in a material with a good balance between the distribution of free volume generated by $CH_3$ moieties of durene diamine and the good packing induced by the mPDA moieties.

Therefore, embodiments of the disclosure include a method for separating components of a natural gas stream. The method includes the steps of receiving an inlet stream comprising natural gas, the inlet stream having an inlet pressure, and the inlet stream further comprising methane, helium, and an impurity; allowing the inlet stream to contact a block co-polyimide membrane, the block co-polyimide membrane exhibiting both higher permeability for and higher selectivity for the helium and the impurity than for the methane at the inlet pressure of the inlet stream; separating the methane from the helium and the impurity to create a retentate stream, the retentate stream comprising an increased concentration of methane relative to the inlet stream; and creating a permeate stream comprising the helium and the impurity at an increased concentration of helium and impurity relative to a concentration of helium and impurity in the inlet stream.

In some embodiments, the method includes separating the helium from the impurity using a helium-separation block co-polyimide membrane, the helium-separation block co-polyimide membrane exhibiting both higher permeability for and higher selectivity for the helium than for the impurity. In some embodiments, the helium-separation block co-polyimide membrane is substantially the same as the block co-polyimide membrane. In other embodiments, the block co-polyimide membrane is selected from the group consisting of: {(6-FDA-mPDA)-(6-FDA-durene)}; {6-FDA-PTCDA-FDA}; {6-FDA-TBB-FDA}; {6-FDA-BAPT-FDA}; {(PTCDA-FDA)-(PMDA-mPDA)}; {(PMDA-FDA)-(PTCDA-mPDA)}; {(ODA-FDA)-(PTCDA-mPDA)}; {(6-FDA-BAPT)-(6-FDA-FDA)}; {(PTCDA-mPDA)-(6-FDA-FDA)}; {(PTCDA-FDA)-(ODA-mPDA)}; {(PTCDA-FDA)-(6-FDA-FDA)}; {(6-FDA-TBB)-(6-FDA-FDA)}; {(6-FDA-TBB)-(6-FDA-durene)}; {(6-FDA-mPDA)-(6-FDA-BAPT)}; {(PTCDA-mPDA)-(6-FDA-FDA)}; {6-FDA-mPDA-BAPT}; and {6-FDA-FDA-mPDA}.

Still in other embodiments, the block co-polyimide membrane is {(6-FDA-mPDA)-(6-FDA-durene)}. Still in yet other embodiments, the impurity comprises more than one component selected from the group consisting of: $CO_2$, $N_2$, and $H_2S$. In some embodiments, the inlet stream comprises $H_2S$ between about 1 volume percent concentration and about 20 volume percent concentration. In some other embodiments, the inlet steam comprises $H_2S$ between about 10 volume percent concentration and about 20 volume percent concentration. Still in some other embodiments, the inlet pressure of the inlet stream is between about 200 psia and about 1,000 psia. In some embodiments, the inlet pressure of the inlet stream is between about 500 psia and about 1000 psia.

In other embodiments, the inlet pressure of the inlet stream is between about 900 psia and about 1,000 psia. In some embodiments, the method further comprises the steps of combining more than one monomer in a mixture of monomers; creating a block co-polyimide polymer; and forming the block co-polyimide membrane from the block co-polyimide polymer by applying a solution casting method to the block co-polyimide polymer.

In other embodiments, the more than one monomer is selected from the group consisting of: 6-FDA; mPDA; durene diamine; PTCDA; PMDA; BAPT; TBB; FDA; and ODA. Still in other embodiments, the mixture of monomers comprises 6-FDA, mPDA, and durene diamine. Still in other embodiments, the method further comprises the step of adjusting operating conditions of a system, the system comprising the block co-polyimide membrane, such that pure gas selectivity of the block co-polyimide membrane to helium relative to the methane is between about 50 and about 150. In some embodiments, the method further comprises the step of adjusting operating conditions of a system, the system comprising the block co-polyimide membrane, such that pure gas selectivity of the block co-polyimide membrane to $CO_2$ relative to the methane is between about 30 and about 60.

Still in other embodiments, operating conditions of a system comprise the inlet pressure of the inlet stream. In some embodiments, the method further comprises the step of improving performance of the block co-polyimide membrane with a chemical modification selected from the group consisting of: bromination of the block co-polyimide membrane; molecular weight increase of the block co-polyimide membrane; and modification with bulky diamine groups including 9,9-bis(4-aminophenyl)fluorine, 9,9-bis(4-aminophenyl-3-isopropyl-5-methyl-phenyl)fluorine, and 4,4'-methylene bis(2,6-diisopropylaniline).

In some embodiments, a co-polyimide (6-FDA-mPDA)-(6-FDA-durene) block ratio is selected from the block ratios consisting of: (2500/15000); (15000/2500); (2500/2500); (5000/5000); (7500/7500); (10000/10000); (12500/12500); (15000/15000); and (20000/20000). In other embodiments, co-polyimide (6-FDA-mPDA)-(6-FDA-durene) block ratios comprise (5000/5000) and (15000/15000). Still in other embodiments, the method further comprises the step of adjusting operating conditions of a system, the system comprising a brominated block co-polyimide membrane, such that pure gas permeability of the brominated block co-polyimide membrane to $CO_2$ is about 115 barriers. In yet other embodiments, the method further comprises the step of adjusting operating conditions of a system, the system comprising a brominated block co-polyimide membrane, such that the pure gas permeability of the block co-polyimide membrane to He is about 110 barriers.

Still in other embodiments, the method further comprises the step of adjusting operating conditions of a system, the system comprising a block co-polyimide membrane, such that mixed gas selectivity of the block co-polyimide membrane to $H_2S$ and $CO_2$ relative to methane are about 23 and 27, respectively.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of compositions and methods for gas component separation of raw natural gas, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Embodiments of the present disclosure teach membrane gas separation applications particularly for sour gas feed separations and helium recovery from natural gas using aromatic block co-polyimide membranes that exhibit high gas permeabilities and selectivities in both pure and mixed gas streams. Embodiments of these aromatic block co-polyimide membranes can be developed from a wide range of monomers. One such monomer includes 2,2'-bis-(3,4-dicarboxyphenyl) hexafluoropropane dianhydride, also known as 4,4'-(hexafluoroisopropylidene) diphthalic dianhydride, also known as 6-FDA.

Some embodiments of the present disclosure use monomers such as 1,3-phenylenediamine, also known as mPDA. Some embodiments of the present disclosure use monomers such as 2,3,5,6-tetramethyl-1,4-phenylenediamine, also known as durene diamine. Such exemplary monomers are used in combination to form different block lengths of (6-FDA-mPDA)-(6-FDA-durene) block co-polyimides. The chemical structure of certain exemplary monomers are pictured in Table 1.

TABLE 1

Chemical structures of exemplary monomers for use in embodiments of the present disclosure.

| 6-FDA | mPDA | Durene diamene |
|---|---|---|

Figure 1:
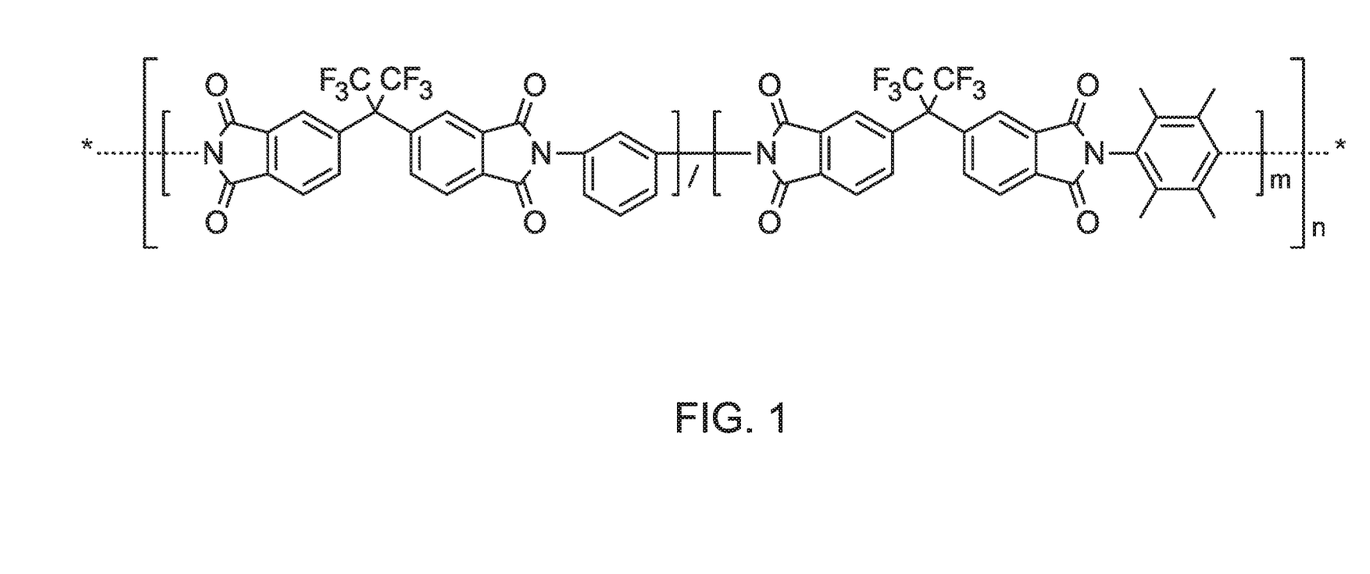
FIG. 1 is a schematic representation of one embodiment of a 2,2'-bis-(3,4-dicarboxyphenyl) hexafluoropropane dianhydride (also known as 6-FDA) 1,3-phenylenediamine (also known as mPDA) 1,2,4,5-tetramethylbenzene (also known as durene) block co-polyimide (also referred to throughout the disclosure as (6-FDA-mPDA)-(6-FDA-durene) block co-polyimide or block co-polymer).

FIG. 1 is a schematic representation of one embodiment of a (6-FDA-mPDA)-(6-FDA-durene) block co-polyimide or block co-polymer. In certain embodiments of the disclosure, in order to improve the performance of block co-polyimides and produce less rigid polymers that are mechanically workable as membranes, chemical modifications such as bromination of the synthesized co-polyimides and molecular weight increase of the co-polyimides are used. Modifications with other suitable reagents such as bulky diamine groups including 9,9-bis(4-aminophenyl) fluorine (also known as CARDO), 9,9-bis(4-aminophenyl-3-isopropyl-5-methyl-phenyl)fluorine (also known as CARDOS), and 4,4'-methylene bis(2,6-diisopropylaniline) (also known as MDIPA) are used.

These modification steps can significantly improve the performance of the co-polyimides, in some embodiments, as to one or more of permeability, selectivity, and sensitivity to molecular size of individual gas components in a gaseous mixture. In some embodiments, the block co-polyimide membranes of the present disclosure exhibit substantial cross-linking. In other embodiments, substantially no cross-linking is observed, and the membranes function in the absence of cross-linking.

In certain examples of the present disclosure, n=1; however, other suitable values for n can be conceived by one of ordinary skill in the art depending on the application. Suitable values for (Um) in FIG. 1 include, but are not limited to, (2500/15000), (15000/2500), (2500/2500), (5000/5000), (7500/7500), (10000/10000), (15000/15000), (20000/20000).

In addition, development of aromatic block co-polyimides of the present disclosure can be carried out using other monomers including: 3,4,9,10-Perylentetracarbonsauredianhydrid, also known as PTCDA; Pyromellitic dianhydride, also known as PMDA; 1,4-bis(4-aminophenoxy)triptycene, also known as BAPT; 4,5,6,7-Tetrabromo-2-azabenzimidazole, also known as TBB; 4,4'-(9-Fluorenylidene)dianiline, also known as FDA; and 4,4'-Oxydiphthalic anhydride, also known as ODA.

Such example monomers can form example block co-polymers including for example: {6-FDA-PTCDA-FDA}; {6-FDA-TBB-FDA}; {6-FDA-BAPT-FDA}; {(PTCDA-FDA)-(PMDA-mPDA)}; {(PMDA-FDA)-(PTCDA-mPDA)}; {(ODA-FDA)-(PTCDA-mPDA)}; {(6-FDA-BAPT)-(6-FDA-FDA)}; {(PTCDA-mPDA)-(6-FDA-FDA)}; {(PTCDA-FDA)-(ODA-mPDA)}; {(PTCDA-FDA)-(6-FDA-FDA)}; {(6-FDA-TBB)-(6-FDA-FDA)}; {(6-FDA-TBB)-(6-FDA-Durene)}; {(6-FDA-mPDA)-(6-FDA-BAPT)}; {(PTCDA-mPDA)-(6-FDA-FDA)}; {6-FDA-mPDA-BAPT}; and {6-FDA-FDA-mPDA}.

The process of gas permeation through polymeric membranes is predominantly modeled by the solution-diffusion mechanism. The transport of a penetrant through a nonporous film involves three steps: (1) first, the dissolution of the penetrant in the film; (2) followed by a transfer of the penetrant across the membrane due to a concentration gradient; and (3) desorption of the penetrant to the permeate side. The relative affinity and transfer rate of each penetrant in the polymer define the transport and separation of the gases. The dissolution of the penetrant in its simplest mathematical form is represented by Henry's law shown as Equation 1:

$$C = Sp \qquad \text{Equation 1.}$$

The diffusion rate across the membrane is modeled by Fick's law of diffusion shown as Equation 2:

$$J = -D\frac{\partial C}{\partial X}. \qquad \text{Equation 2}$$

In Equations 1 and 2, S is the solubility constant, D is the diffusion coefficient, J is the penetrant flux, $$\frac{\partial C}{\partial X}$$

is the concentration gradient across the membrane, and C is the concentration of dissolved species in equilibrium with a gas at partial pressure p. Assuming that the diffusion and solubility coefficients are independent of concentration, the permeation rate per unit area of membrane, through thickness l, is then expressed as Equation 3:

$$j_i = \frac{D_i S_i (p_{if} - p_{ip})}{l} = \frac{p_i(p_{if} - p_{ip})}{l}. \qquad \text{Equation 3}$$

$J_i$ is the molar flux (expressed in terms of cm³ (at standard temperature and pressure (STP))/cm²·s), $p_{if}$ is the partial pressure of component i on the feed side, and $p_{ip}$ the partial pressure of component i on the permeate side. The diffusion coefficient, $D_i$, is an indication of the mobility of the individual molecules in the membrane material, and the gas sorption coefficient ($S_i$, with units of cm³ (STP) of component i/cm³ of polymer per pressure) is an indication of the volume of molecules dissolved in the membrane material. The product $D_iS_i$ can be defined as $P_i$, which is called the membrane permeability; and this is a measure of the membrane's ability to permeate gas. The conventional unit for expressing permeability is the Barrer, where 1 Barrer=$10^{-10}$ (cm³ (STP)·cm)/(cm²·s·cmHg). An accurate measure of a membrane's ability to separate two gases, i and j, is the ratio of their permeabilities, $\alpha_{i/j}$; this parameter is called the membrane selectivity, and it can be written as Equation 4:

$$\alpha_{i/j} = \frac{P_i}{P_j} = \left[\frac{D_i}{D_j}\right]\left[\frac{S_i}{S_j}\right]. \qquad \text{Equation 4}$$

The ratio $$\left[\frac{D_i}{D_j}\right]$$

is the ratio of the diffusion coefficients of two gases and can be viewed as the mobility selectivity, which indicates the relative diffusion of individual molecules of two gases i and j. Mobility selectivity is proportional to the ratio of the molecular size of the two gases. The ratio of the sorption coefficients, $$\left[\frac{S_i}{S_j}\right],$$

indicates the relative concentration of gases i and j in the membrane material. The sorption of a component increases with the condensability of gas.

The separation factor, $\alpha^*_{i/j}$, is often used as a measure of efficiency or selectivity for mixed gas permeation. This is conventionally given as Equation 5:

$$\alpha^*_{i,j} = \frac{y_i/y_j}{x_i/x_j}. \qquad \text{Equation 5}$$

In Equation 5, $y_i$ and $y_j$ are the mole fraction of components i and j on the permeate side, and $x_i$ and $x_j$ are the mole fraction of components i and j on feed side of membrane, respectively.

Example embodiments of the disclosure provided as follows show the permeation behavior of pure gas, and gas mixtures consisting of He, $CO_2$, $H_2S$, $CH_4$, $N_2$ and $C_2H_6$, through dense film membranes of the block co-polyimide (6-FDA-mPDA)-(6-FDA-durene) for simultaneous separation of $CO_2$, $H_2S$, $N_2$ and other contaminants from sour gas streams, and for helium recovery from natural gas.

EXAMPLES

Example 1: Preparation of Block-Co-Polyimide Dense Film Membrane (6-FDA-mPDA)-(6-FDA-durene)

Aromatic (6-FDA-mPDA)-(6-FDA-durene) co-polyimide (FIG. 1) was synthesized according to the following procedure from 2,2'-bis-(3,4-dicarboxyphenyl) hexafluoropropane dianhydride, also known as 6-FDA (recrystallized from acetic anhydride), 2,3,5,6-tetramethyl-1,4-,phenylenediamine, also known as durene diamine, and 1,3-phenylenediamine, also known as mPDA.

The block co-polyimide (6-FDA-mPDA)-(6-FDA-durene) (5000/5000) was synthesized as follows. First, mPDA (10 mmol) was dissolved in m-Cresol (17 mL). Then, 6-FDA (8.9974 mmol) was added to the mPDA and m-Cresol, and the mixture was stirred at 180° C. under $N_2$ for 8 hours. The reaction was cooled to room temperature, and durene diamine (7.4778 mmol), 6-FDA (8.4805 mmol) and m-Cresol (17 mL) were added to the mixture. The resulting solution was stirred at 180° C. under $N_2$ for 8 hours. The reaction was cooled to room temperature and diluted with 10 mL m-Cresol. The mixture was poured into methanol (250 mL). The resulting polymer was filtered, washed with methanol, crushed and extracted with methanol (by a soxhlet extractor) to remove any remaining trace of m-Cresol. The polymer was then dried at 150° C. under vacuum overnight.

NMR identification data for the block co-polyimide (6-FDA-mPDA)-(6-FDA-durene) (5000/5000) is presented as follows: $^1$H NMR (400 MHz, DMSO-d6, δ, ppm): 8.17 (d, 4.72H, 6FDA), 7.96-7.87 (m, 6.08H, 6FDA), 7.75-7.64 (m, 4.08H, 6FDA/mPDA), 7.55-7.52 (m, 3.97H, mPDA), 2.06 (s, 12H, durene). Tg=349° C., Td=507° C., d=1.39 g/cm³. The data obtained are discussed further herein.

A large block length and a large ratio of different blocks in co-polyimides can greatly diminish selectivity in some embodiments. However, permeability is much higher for higher block length co-polyimides (such as, for example, (15000/15000)) than for lower block length polymers (such as, for example, (5000/5000)). In the case of large blocks, only relatively few of each block can be incorporated in one polymer chain, and thus the excess disrupts polymer chain packing in the membrane creating domains containing mostly 6FDA-mPDA and others containing mostly 6FDA-durene. $CH_3$ moieties of durene diamine increase inter-chain spacing thus diminishing the membrane's ability at discriminating gases (selectivity) in a way that normally cannot be compensated by mPDA moieties.

However, in the case of small length blocks, such as, for example, (5000/5000), the blocks are small enough for the main polymer chain to organize in a way that the resulting membrane benefits from the properties of the parent homopolymers. The increase in inter-chain spacing allowing for faster transport does not diminish greatly the ability of 6FDA-mPDA sections to discriminate gases based on their size. This results in a material with a good balance between the distribution of free volume generated by $CH_3$ moieties of durene diamine and the good packing induced by the mPDA moieties.

Block co-polyimide (6-FDA-mPDA)-(6-FDA-durene) (15000/15000) was synthesized as follows. First, mPDA (10 mmol) was dissolved in m-Cresol (18 mL). Then, 6-FDA (9.6592 mmol) was added, and the mixture was stirred at 180° C. under $N_2$ for 8 hours. The reaction was cooled to room temperature and durene diamine (8.4958 mmol), 6-FDA (8.8366 mmol), and m-Cresol (18 mL) were added to the mixture. The resulting solution was stirred at 180° C. under $N_2$ for 8 hours. The reaction was cooled to room temperature and diluted with 10 mL m-Cresol. The mixture was poured into methanol (250 mL). The resulting polymer was filtered, washed with methanol, crushed and extracted with methanol (by a soxhlet extractor) to remove any remaining trace of m-Cresol. The polymer was then dried at 150° C. under vacuum overnight.

NMR identification data for the block co-polyimide (6-FDA-mPDA)-(6-FDA-durene) (15000/15000) is presented as follows: $^1$H NMR (400 MHz, DMSO-d6, δ, ppm): 8.19 (m, 6FDA), 7.98 (m, 6FDA), 7.78 (s, 6FDA), 7.70 (m, mPDA), 7.58 (m, mPDA), 2.09 (s, durene). Tg=344° C., Td=507° C., d=1.54 g/cm$^3$.

Brominated block co-polyimide (6FDA-mPDA)-(6FDA-durene) (15000/15000) was synthesized as follow: 1 to 5 gram of the co-polyimide was dissolved in 100 mL of chloroform and stirred overnight for complete dissolution. Then, the solution was transferred to a three-necked reactor fixed with a mechanical stirrer and an $N_2$ gas inlet. Stirring was started at 400 rpm.

In a separate beaker, 50 mL of chloroform solvent was taken and added carefully to 6 mL of liquid bromine, and this bromine solution was transferred to a separating funnel fixed with the three-necked reactor. Next, the bromine solution was slowly and drop-wisely added from the separating funnel to the polyimide solution under constant stirring. The reactor was covered with aluminum foil. The separating funnel was then removed after complete transfer of bromine solution and the reaction was allowed for more than about 6 hours under constant stirring. The brominated co-polyimide was precipitated by slowly and carefully adding a required amount of methanol. The solution was then stirred for 30 minutes, and then the brominated polymer was filtered out. The polymer was then dried at room temperature overnight followed by oven drying at 60° C. under vacuum for another overnight period.

A block co-polyimide dense film membrane was prepared as follows. Dense films were prepared by a solution casting method. An N-methyl-2-pyrrolidone (NMP) solution containing about 2-5 wt. % of polymer was filtered through a 45-μm filter, then a 10-μm filter and finally a 1-μm filter to remove non-dissolved materials and dust particles. The solution was then cast on a dry and clean petri dish. The dish was slowly heated in an oven to 50° C. for about 24 hr, then to 100° C. for another 24 hr, and finally to 150° C. for 24 hr to allow for film formation. The resulting film was finally dried in an oven at 180° C. overnight to remove residual solvent.

Example 2: Evaluation of the $CO_2/CH_4$ and $He/CH_4$ Pure Gas Separation Performance of (6-FDA-mPDA)-(6-FDA-Durene) Membrane Prepared in Example 1

The permeability coefficients of pure gases $CO_2$, $CH_4$, and He, and selectivities for $CO_2/CH_4$ and $He/CH_4$ through the block co-polyimide (6-FDA-mPDA)-(6-FDA-durene) tested at various upstream pressures (200-400 psia) and 35° C. are shown in Tables 2 and 3 as follows. The co-polyimide membrane (5000/5000) has pure gas permeabilities of about 37 and 93 barriers for $CO_2$ and He, respectively, and the pure gas $CO_2/CH_4$ and $He/CH_4$ selectivities are about 61 and 155, respectively, as shown in Table 2.

However the block co-polyimide with (15000/15000) block length exhibited pure gas permeabilities of about 44 and 70 barriers for $CO_2$ and He, respectively, and the pure gas $CO_2/CH_4$ and $He/CH_4$ selectivities are about 30 and 48, respectively as shown in Table 3. Modification of the membrane by bromination greatly improves the membrane performance as the pure gas permeabilities of the brominated membrane (15000/15000) shown in Table 3 significantly increases to 115 and 110 barriers for $CO_2$ and He, respectively. Pure gas $CO_2/CH_4$ and $He/CH4$ selectivities are about 31 and 30 respectively, which are similar or insignificantly changed as compared to an unbrominated membrane.

TABLE 2

Pure gas permeation properties of block co-polyimide (6-FDA-mPDA)-(6-FDA-durene) (5000/5000) membrane at 35° C.

| Pressure | Permeability (Barrer) | | | | Selectivity | | |
|---|---|---|---|---|---|---|---|
| (psia) | $CO_2$ | $CH_4$ | $N_2$ | He | $CO_2/CH_4$ | $N_2/CH_4$ | $He/CH_4$ |
| 200 | 37.44 | 0.60 | 1.55 | 93 | 62.40 | 2.58 | 155.0 |
| 300 | 36.00 | 0.59 | 1.54 | 91 | 61.00 | 2.61 | 154.5 |
| 400 | 37.73 | 0.62 | 1.56 | 93 | 60.85 | 2.51 | 150.1 |

Figure 2:
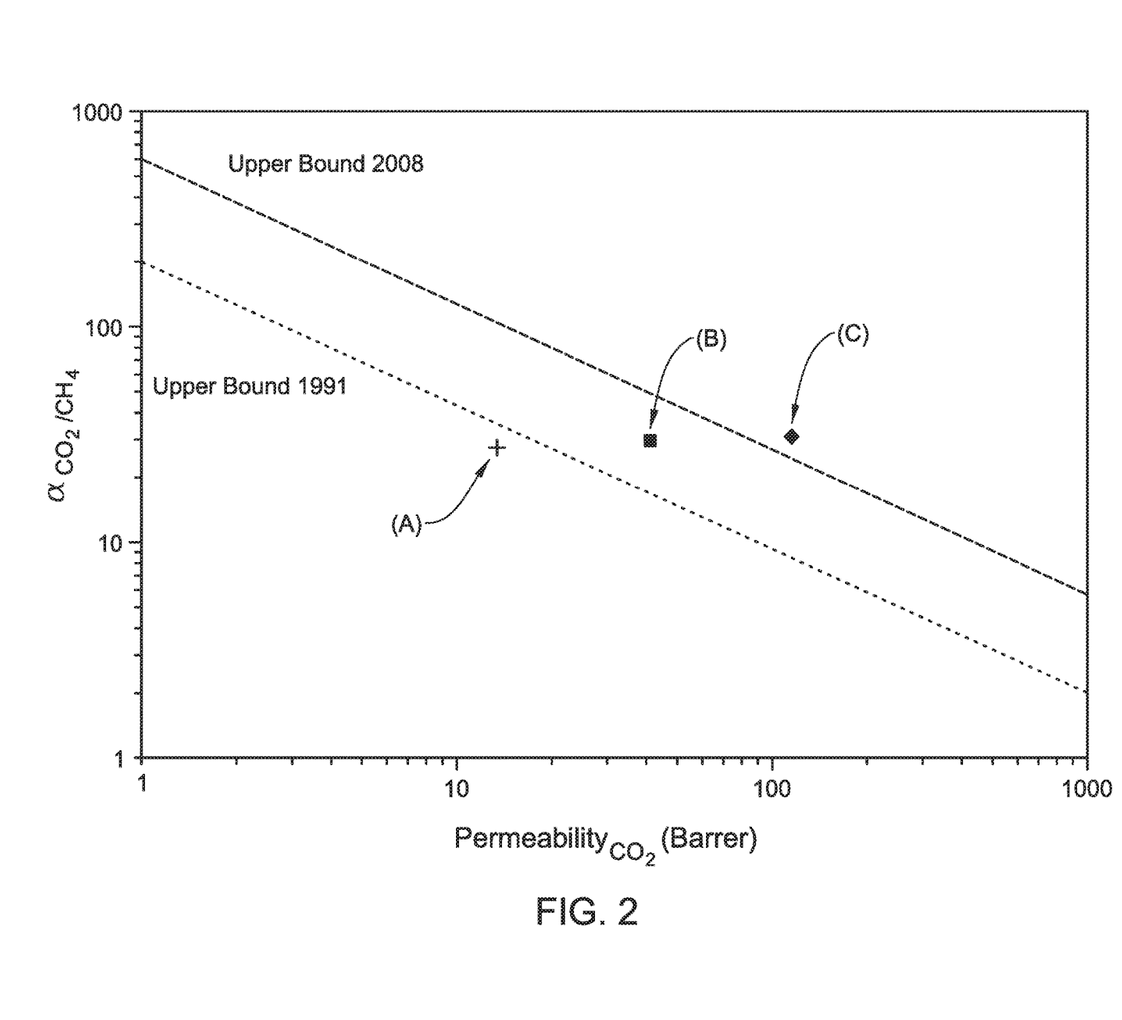
FIG. 2 is a graph showing the $CO_2/CH_4$ permeability-selectivity trade-off for a (6-FDA-mPDA)-(6-FDA-durene) block co-polyimide membrane of the present disclosure.

Data point B in FIG. 2 is a data point of $CO_2$ permeability and $CO_2/CH_4$ selectivity obtained at 200 psia for the block co-polyimide (6-FDA-mPDA)-(6-FDA-durene) (15000/15000) membrane at 35° C. shown in Table 3 below.

TABLE 3

| Pressure | Permeability (Barrer) | | | | Selectivity | | |
|---|---|---|---|---|---|---|---|
| (psia) | $CO_2$ | $CH_4$ | $N_2$ | He | $CO_2/CH_4$ | $N_2/CH_4$ | $He/CH_4$ |
| Pure gas permeation properties of unbrominated and brominated block co-polyimide (6-FDA-mPDA)-(6-FDA-durene) (15000/15000) membrane at 35° C. | | | | | | | |
| 100 | 43.5 | 1.47 | 2.30 | 70.1 | 29.7 | 1.57 | 47.8 |
| 200 | 43.1 | 1.60 | 2.43 | 69.6 | 27.0 | 1.52 | 43.6 |
| 300 | 44.8 | 1.63 | 2.53 | 69.0 | 27.4 | 1.55 | 42.2 |
| Pure gas permeation properties of the brominated block co-polyimide (15000/15000) | | | | | | | |
| 100 | 115.0 | 3.7 | 4.8 | 110 | 31.1 | 1.30 | 29.7 |

Example 3: Evaluation of the $CO_2/CH_4$ Mixed Gas Separation Performance of the (6-FDA-mPDA)-(6-FDA-Durene) Block Co Polyimide Membrane Prepared in Example 1

The permeability properties of quaternary gas mixtures consisting of 10, 59, 30 and 1 vol. % concentration $CO_2$, $CH_4$, $N_2$ and $C_2H_6$, respectively, through the block co-polyimide membranes were tested at different upstream pressures. The results are summarized in Tables 4 and 5. The permeability values of $CO_2$ decrease with increasing feed pressure, and $CO_2/CH_4$ selectivity also declines to about 32, as shown in Table 5.

TABLE 4

Mixed gas permeation properties of the block co-polyimide (6-FDA-mPDA)-(6-FDA-durene) (15000/15000) membrane as a function of feed pressure at 22° C. using a gas mixture containing 10, 59, 30 and 1 vol. % concentration of $CO_2$, $CH_4$, $N_2$ and $C_2H_6$ respectively.

| Pressure | Permeability (Barrer) | | | | Separation factor | | |
|---|---|---|---|---|---|---|---|
| (psia) | $CO_2$ | $CH_4$ | $N_2$ | $C_2H_6$ | $CO_2/CH_4$ | $N_2/CH_4$ | $C_2H_6/CH_4$ |
| 200 | 26.68 | 1.42 | 1.67 | 0.66 | 18.78 | 1.18 | 0.46 |
| 300 | 26.45 | 1.79 | 2.12 | 1.08 | 14.82 | 1.19 | 0.60 |
| 400 | 24.38 | 2.16 | 2.46 | 1.49 | 11.31 | 1.14 | 0.69 |
| 500 | 23.09 | 2.66 | 2.94 | 2.05 | 8.67 | 1.10 | 0.77 |

TABLE 5

Mixed gas permeation properties of the block co-polyimide (6-FDA-mPDA)-(6-FDA-durene) (5000/5000) membrane as function of feed pressure at 22° C. using a gas mixture containing 10, 59, 30 and 1 vol. % concentration of $CO_2$, $CH_4$, $N_2$ and $C_2H_6$ respectively.

| Pressure | Permeability (Barrer) | | | | Separation factor | | |
|---|---|---|---|---|---|---|---|
| (psia) | $CO_2$ | $CH_4$ | $N_2$ | $C_2H_6$ | $CO_2/CH_4$ | $N_2/CH_4$ | $C_2H_6/CH_4$ |
| 300 | 18.54 | 0.53 | 0.82 | 0.21 | 34.84 | 1.54 | 0.38 |
| 400 | 16.92 | 0.49 | 0.76 | 0.19 | 34.33 | 1.54 | 0.39 |
| 500 | 15.54 | 0.48 | 0.73 | 0.19 | 32.10 | 1.51 | 0.39 |

Example 4: Evaluation of the $CO_2/CH_4$ and $H_2S/CH_4$ Sour Quaternary Mixed Gas Separation Performance of the (6-FDA-mPDA)-(6-FDA-Durene) Membrane Prepared in Example 1

The permeability properties of a simulated sour gas mixture consisting of 10, 59-60, 10-30 and 1-20 vol. % concentration of $CO_2$, $CH_4$, $N_2$ and $H_2S$, respectively, through the membrane of block size (5000/5000) were tested at different acid gas ($CO_2+H_2S$) partial pressures and different $H_2S$ concentrations. These results are shown in Table 6.

TABLE 6

Mixed gas permeation properties of the block co-polyimide (6-FDA-mPDA)-(6-FDA-durene) (5000/5000) membrane as a function of $H_2S$ composition in the feed gas (with total pressure of 500 psia) and acid gas ($CO_2 + H_2S$) partial pressure at 22° C. using a gas mixture containing 10, 59-60, 10-30 and 1-20 vol. % concentration of $CO_2$, $CH_4$, $N_2$ and $H_2S$, respectively.

| $H_2S$ conc., (vol. %) | Partial pres. (psia) | Permeability (Barrer) | | | | Separation factor | | |
|---|---|---|---|---|---|---|---|---|
| | | $CO_2$ | $CH_4$ | $N_2$ | $H_2S$ | $CO_2/CH_4$ | $N_2/CH_4$ | $H_2S/CH_4$ |
| 1 | 55 | 18.72 | 0.51 | 0.77 | 7.74 | 36.93 | 1.51 | 15.27 |
| 10 | 100 | 9.494 | 0.28 | 0.39 | 5.18 | 33.55 | 1.38 | 18.29 |
| 20 | 150 | 13.38 | 0.49 | 0.44 | 11.2 | 27.25 | 0.89 | 22.85 |

The membrane was subjected to feed gas compositions with up to a maximum of 20 vol. % concentration $H_2S$. As shown in Table 6, permeability coefficients of all the penetrants, $CO_2$, $CH_4$, $N_2$ and $H_2S$ stay relatively constant or slightly decrease with the increase in pressure. The $H_2S/CH_4$ separation factor increases as the partial pressure and $H_2S$ concentration in the feed are increased. The value was about 23 at the maximum total pressure of 500 psia, $H_2S$ concentration of 20 vol. %, and $H_2S$ partial pressure of 150 psia. Additionally, the $CO_2/CH_4$ separation factor decreases with increasing partial pressure and $H_2S$ concentration, and the selectivity at low partial pressure was as high as about 37, and it was about 27 at high pressure.

Importantly, at a moderate feed pressure of 500 psia and 20 vol. % concentration $H_2S$ in the feed gas mixture, $H_2S/CH_4$ and $CO_2/CH_4$ selectivities are still about 23 and 27, respectively, in the block co-polyimide membrane. Moreover, the $CO_2/CH_4$ selectivity of the co-polyimide does not degrade to the same extent as was reported for cellulose acetate (CA), even under the much more aggressive conditions tested here. This stability at moderate pressures and high $H_2S$ concentration is surprising and unexpected, and is shown in FIGS. 2 and 3

Referring now to FIG. 2, a graph is provided showing the $CO_2/CH_4$ permeability-selectivity trade-off for a (6-FDA-mPDA)-(6-FDA-durene) block co-polyimide membrane of the present disclosure. Point (A) shows the selectivity ratio of $CO_2/CH_4$ versus the permeability of $CO_2$ in barrer for a (6-FDA-mPDA)-(6-FDA-durene) membrane of the present disclosure at 500 psia total pressure, 20 vol. % concentration $H_2S$, and 150 psia $H_2S$ partial pressure. These results are shown in Table 6. Point (B) shows the selectivity ratio of $CO_2/CH_4$ versus the permeability of $CO_2$ in barrer for a (6-FDA-mPDA)-(6-FDA-durene) membrane of the present disclosure at about 200 psia, when pure gases including $CO_2$, $CH_4$, and He were tested across the membrane, as described in Example 2. These results are shown in Table 2. Point (C) in FIG. 2 shows the selectivity ratio of $CO_2/CH_4$ versus the permeability of $CO_2$ in barrer for a brominated (6-FDA-mPDA)-(6-FDA-durene) membrane of the present disclosure at 100 psia, when pure gases including $CO_2$, $CH_4$, and He were tested across the membrane, as described in Example 2. These results are shown in Table 3.

Figure 3:
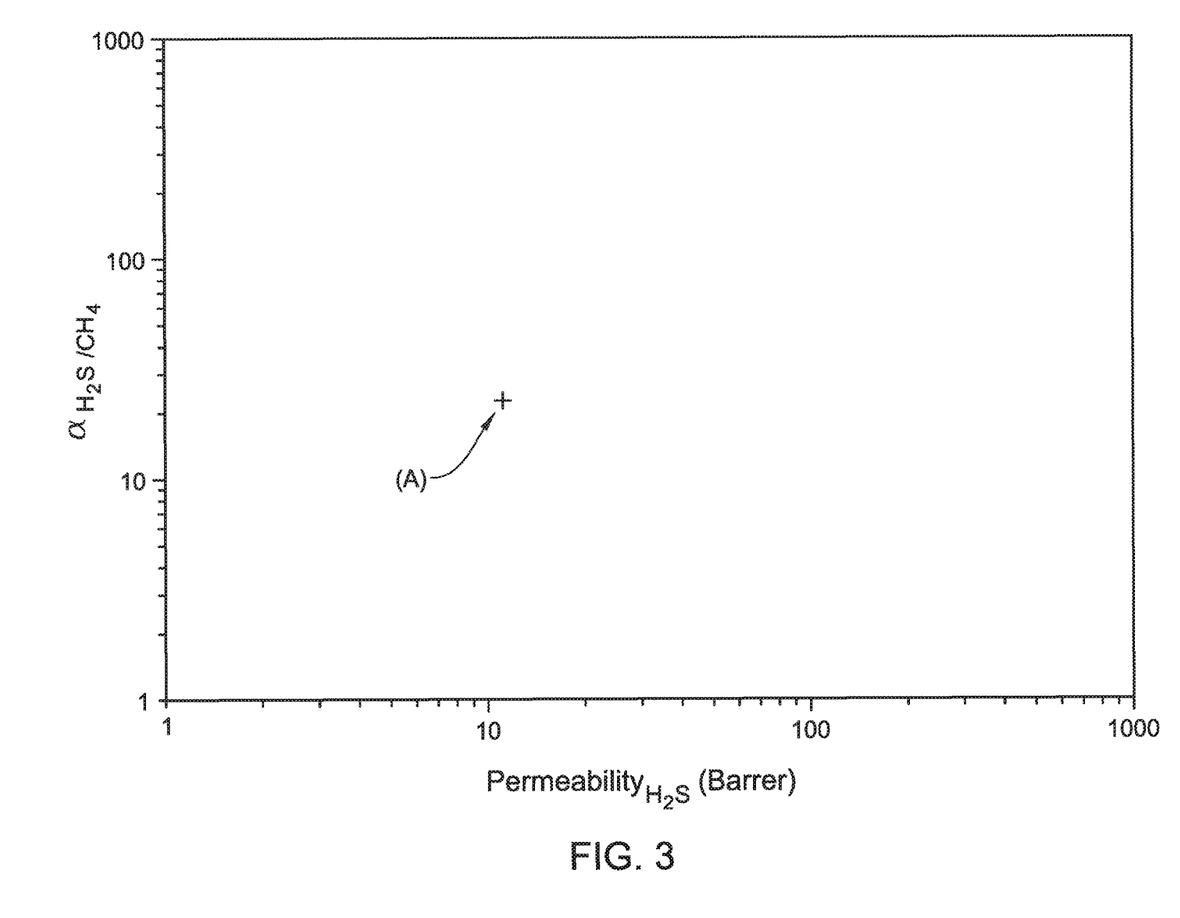
FIG. 3 is a graph showing the $H_2S/CH_4$ permeability-selectivity trade-off for a (6-FDA-mPDA)-(6-FDA-durene) block co-polyimide membrane of the present disclosure.

Referring now to FIG. 3, a graph is provided showing the $H_2S/CH_4$ permeability-selectivity trade-off for a (6-FDA-mPDA)-(6-FDA-durene) block co-polyimide membrane of the present disclosure. Point (A) shows the selectivity ratio of $H_2S/CH_4$ vs. the permeability of $H_2S$ in barrer for the (6-FDA-mPDA)-(6-FDA-durene) membrane of the present disclosure at 500 psia total pressure, 20 vol. % concentration $H_2S$, and 150 psia $H_2S$ partial pressure. These results are shown in Table 6.

Figure 4:
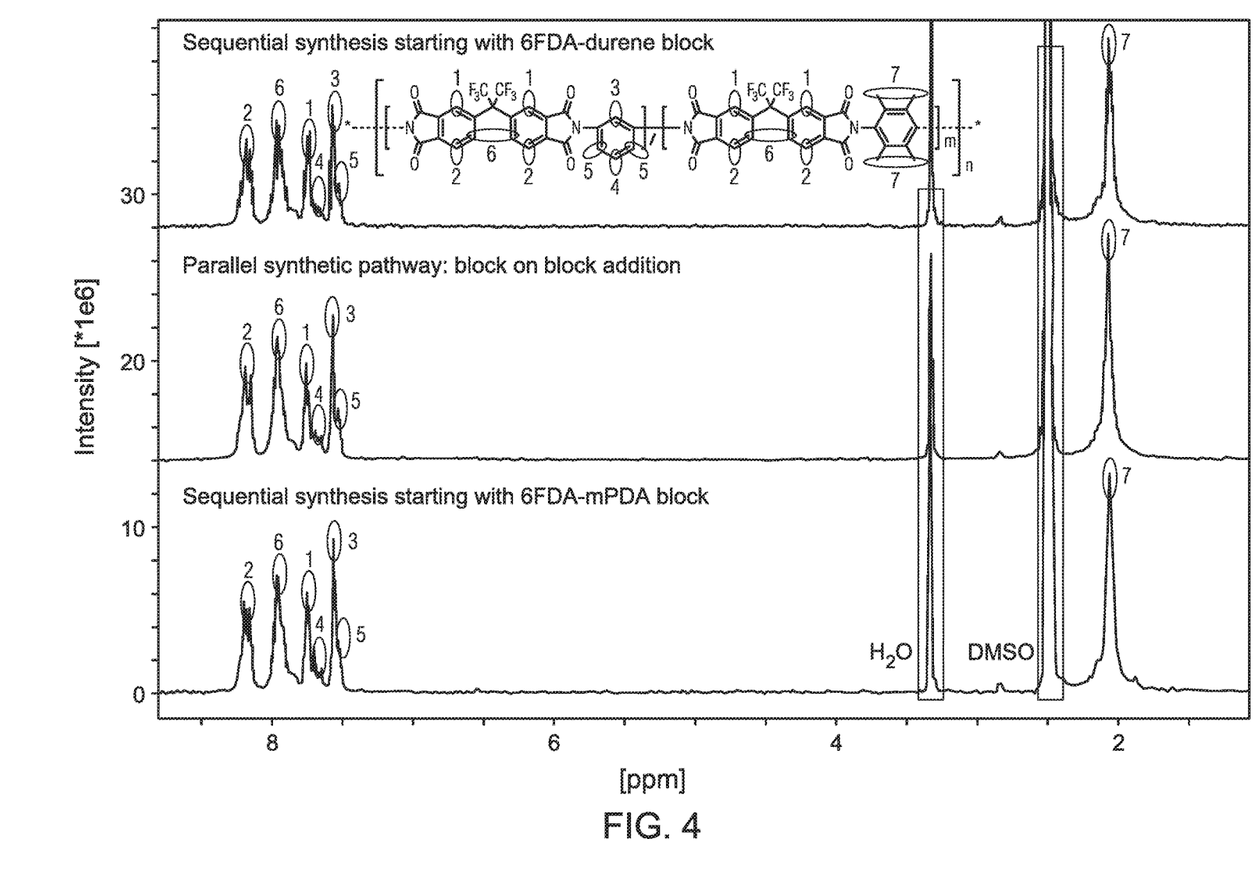
FIG. 4 is a graph showing the overlay of the $^1H$ NMR spectrum of (6FDA-mPDA)-(6FDA-durene) synthesized using three different pathways.

FIG. 4 shows an $^1H$ NMR spectrum of the obtained co-polyimides. The peaks in the range of 8.17-7.52 ppm are assigned to the hydrogen atoms of 6FDA and mPDA, and the peak at 2.06 ppm is assigned to the $CH_3$ groups of durene. This confirms the incorporation of all units in the co-polyimides.

In order to make the target copolymers, two different synthetic pathways were considered; sequential and parallel synthesis. The first synthetic pathway was the "sequential synthesis," in which different blocks were built one after another in the same vessel. Without being bound to any theory or principle, it is believed that when the components of the second block are added to the first block they will react preferentially with each other before reacting with the first block.

The second synthetic pathway used in order to obtain block copolymers was the "parallel synthesis". In this case, the pathway starts with making both block components of the final copolymer separately, at the same time, hence controlling their respective length and size distribution. In this way, there are truly two types of blocks that can be reacted onto one another. Another step in the process is the addition of the more soluble block to the less soluble block in m-cresol, followed by heating and mechanical stirring at 180° C. under $N_2$ overnight. The structure of the copolymers obtained via the different synthetic pathways was checked by $^1H$ NMR. In FIG. 4, an overlay of the $^1H$ NMR spectra of block copolymers of (6FDA-mPDA)-(6FDA-durene) can be observed, and the three spectra are substantially identical. It could thus be concluded that the two pathways are equivalent as far as the overall structure of the block copolymers is concerned.

Figure 5:
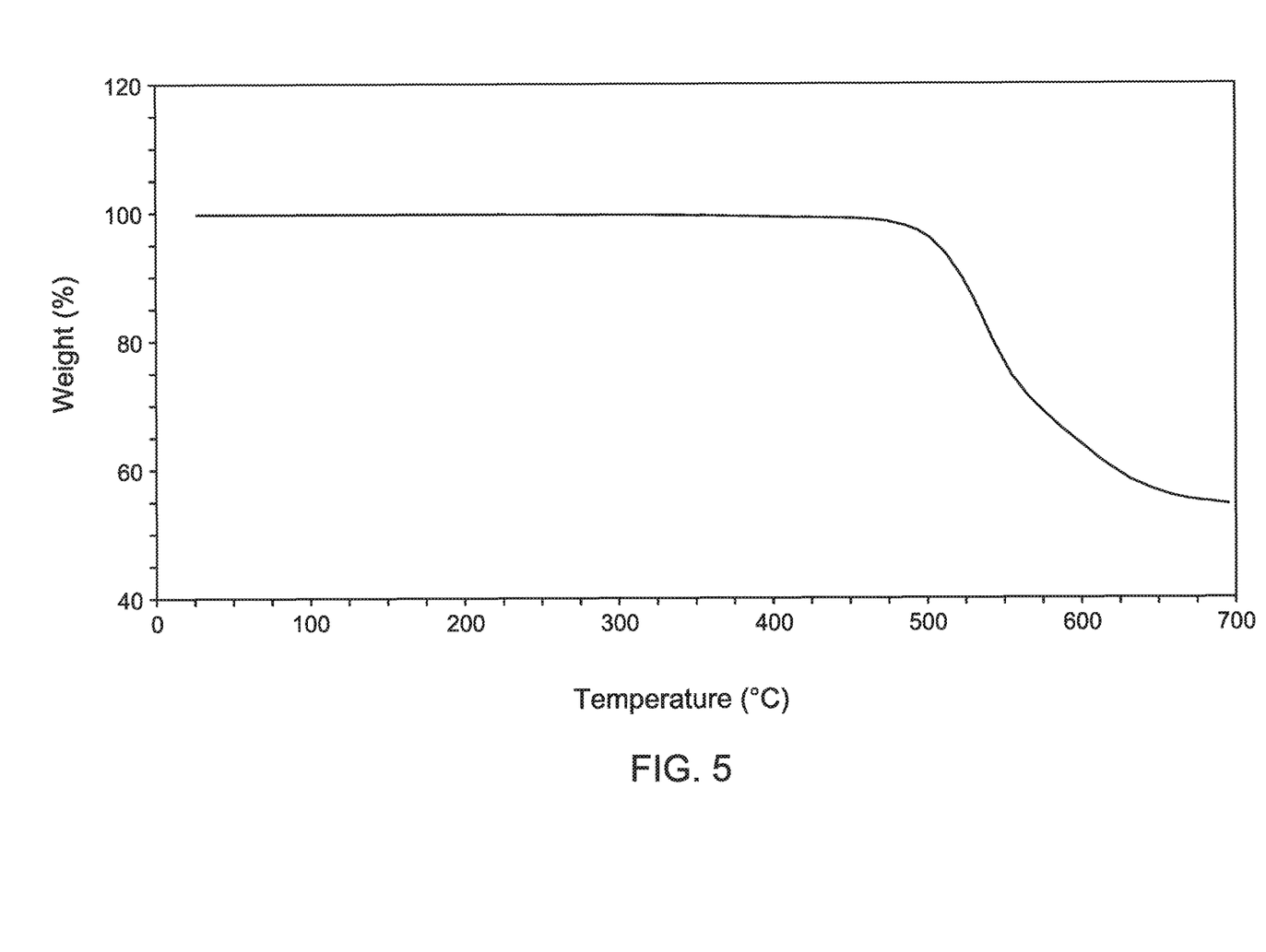
FIG. 5 is a graph showing the thermogravimetric analysis (TGA) trace of (6FDA-mPDA)-(6FDA-durene) (15000/15000) block co-polyimide.

Referring now to FIG. 5, a graph is provided showing the thermogravimetric analysis (TGA) trace of (6FDA-mPDA)-(6FDA-durene) (15000/15000) block co-polyimide. Table 7 displays properties of the synthesized polyimides: (A) (6FDA-mPDA)-(6-FDA-durene) (5000/5000) and (B) (6FDA-mPDA)-(6-FDA-durene) (15000/15000).

TABLE 7

Properties of the synthesized polyimides: (A) (6FDA-mPDA)-(6FDA-durene) (5000/5000) and (B) (6FDA-mPDA)-(6FDA-durene) (15000/15000).

| Polymer | $T_g$ (° C.) | $T_d$ at 5% weight loss ($N_2$) (° C.) | Density (g/cm³) |
|---|---|---|---|
| A | 349 | 507 | 1.39 |
| B | 344 | 507 | 1.54 |

Thermogravimetric analysis was used to study the thermal stability of the prepared polyimides. FIG. 5 shows a typical TGA curve obtained for the synthesized polymers. The temperatures ($T_d$) at 5% weight loss in nitrogen are shown in Table 7. The results show that all synthesized co-polyimides have a very good thermal stability of about 500° C. The glass transition temperature ($T_g$) of the synthesized polymers was determined by differential scanning calorimetry (DSC) and is also shown in Table 7. $T_g$ is an indicator of the cooperative motion of polymeric chains. The densities of the prepared polymers are shown in Table 7. Densities were determined by floatation on small pieces of pre-dried membranes using hexane and tetracholoroethane as solvents.

The results described in Tables 2-6 and FIGS. 2-3 uniquely show greater selectivities and permeabilities for $CO_2$, $H_2S$, and He. The results are surprisingly better than those obtained when using many industrial glassy polymers and other high-performance rubbery and glassy polymer membranes. For example, at a relatively high feed pressure of 500 psia and a relatively high 20 vol. % concentration $H_2S$ in a feed gas mixture comprising $CO_2$, $N_2$, $CH_4$, and $H_2S$, the $H_2S/CH_4$ and $CO_2/CH_4$ ideal selectivities exhibited by membranes of the present disclosure are much greater than those obtained when using standard industrial membranes. Additionally, the $CO_2/CH_4$ selectivity does not degrade or suffer significant loss to the same extent as is reported for cellulose acetate (CA), even under much more aggressive conditions tested here.

Another advantage exhibited by embodiments of membranes in the present disclosure is that the co-polyimide membranes are not only acid gas selective, but also more selective to $N_2$, as compared to $CH_4$. In other words, the permeation of $N_2$ in aromatic polyimides is greater than $CH_4$. In this way, energy is saved as embodiments of the membrane of the present disclosure simultaneously permeate both acid gas and $N_2$, while keeping $CH_4$ on the high pressure side of the membrane, also known as the retentate side.

Another advantage exhibited by embodiments of membranes in the present disclosure is that the modification of the membrane by bromination greatly improve the membrane performance, as the pure gas permeabilities of the brominated membrane significantly increase for both $CO_2$ and He respectively with no or insignificant change in pure gas $CO_2/CH_4$ and $He/CH_4$ selectivities, when compared to unbrominated membrane.

Current commercial membranes exhibit selectivity for $CO_2/CH_4$ and $H_2S/CH_4$ in the range 20 to 26 and permeance of 60 to 80 GPU for $CO_2$ and $H_2S$. These membranes require stringent pretreatment for water and heavy hydrocarbons content, as the membranes are very susceptible to swelling and plasticization in the presence of heavy hydrocarbons, benzene, toluene, and xylene (BTX), water and other condensable gases. A typical natural gas composition includes about 1-20 mol. % $H_2S$; 2-7 mol % $CO_2$; 10-36 mol % inert gases (that include $N_2$, He etc.,); 0.2 mol. % water; 0.2-3.0 mol % $C_{2+}$; and up to 1000 ppm BTX at total operating pressure in the range 800-1000 psi. For further improvement in the economics and minimizing methane slippage, membranes need to exhibit consistent selectivity of $CO_2/CH_4$ and $H_2S/CH_4$ in the range 30 to 40 in wet sour gas with $H_2S$ concentration up to 20 mol. % at total pressure in the range 900-1000 psi; and in the presence of $C_{3+}$ heavy hydrocarbons (about 3%) and benzene, toluene, and xylene (BTX) (about 1,000 ppm); and exhibit consistent permeances of $100^+$ GPU for $CO_2$ and $H_2S$ in the aforementioned mentioned conditions.

Permeance (expressed in GPU, gas permeation unit) is another parameter often used in industry to express the membrane performance. It is a pressure normalized flux, and it is related to permeability by: Permeability units: 1 Barrer=$1 \times 10^{-10}$ (cm³(STP)·cm)/(cm²·s·cmHg). For permeance units: 1 GPU=1 Barrer/1 micron ($10^{-6}$ m).

The singular forms "a," "an," and "the" include plural referents, unless the context clearly dictates otherwise.

In the drawings and specification, there have been disclosed embodiments of compositions and methods for separating the components of raw natural gas, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A method for separating components of a natural gas stream, the method comprising the steps of:
   receiving an inlet stream comprising natural gas, the inlet stream having an inlet pressure, and the inlet stream further comprising methane, helium, and an impurity;
   allowing the inlet stream to contact a block co-polyimide membrane, the block co-polyimide membrane exhibiting both higher permeability for and higher selectivity for the helium and the impurity than for the methane at the inlet pressure of the inlet stream;
   separating the methane from the helium and the impurity to create a retentate stream, the retentate stream comprising an increased concentration of methane relative to the inlet stream; and
   creating a permeate stream comprising the helium and the impurity at an increased concentration of helium and impurity relative to a concentration of helium and impurity in the inlet stream, by selectively permeating through the block co-polyimide membrane both of the helium and the impurity.

2. The method according to claim 1, further comprising the step of:
   separating the helium from the impurity using a helium-separation block co-polyimide membrane, the helium-separation block co-polyimide membrane exhibiting both higher permeability for and higher selectivity for the helium than for the impurity.

3. The method according to claim 2, wherein the helium-separation block co-polyimide membrane is substantially the same as the block co-polyimide membrane.

4. The method according to claim 1, wherein the block co-polyimide membrane is selected from the group consisting of: {(6-FDA-mPDA)-(6-FDA-durene)}; {6-FDA-PTCDA-FDA}; {6-FDA-TBB-FDA}; {6-FDA-BAPT- FDA}; {(PTCDA-FDA)-(PMDA-mPDA)}; {(PMDA-FDA)-(PTCDA-mPDA)}; {(ODA-FDA)-(PTCDA-mPDA)}; {(6-FDA-BAPT)-(6-FDA-FDA)}; {(PTCDA-mPDA)-(6-FDA-FDA)}; {(PTCDA-FDA)-(ODA-mPDA)}; {(PTCDA-FDA)-(6-FDA-FDA)}; {(6-FDA-TBB)-(6-FDA-FDA)}; {(6-FDA-TBB)-(6-FDA-durene)}; {(6-FDA-mPDA)-(6-FDA-BAPT)}; {(PTCDA-mPDA)-(6-FDA-FDA)}; {6-FDA-mPDA-BAPT}; and {6-FDA-FDA-mPDA}.

5. The method according to claim 1, wherein the block co-polyimide membrane is {(6-FDA-mPDA)-(6-FDA-durene)}.

6. The method according to claim 1, wherein the impurity comprises more than one component selected from the group consisting of: $CO_2$, $N_2$, and $H_2S$.

7. The method according to claim 6, wherein the inlet stream comprises $H_2S$ between about 1 volume percent concentration and about 20 volume percent concentration.

8. The method according to claim 6, wherein the inlet steam comprises $H_2S$ between about 10 volume percent concentration and about 20 volume percent concentration.

9. The method according to claim 1, wherein the inlet pressure of the inlet stream is between about 200 psia and about 1,000 psia.

10. The method according to claim 1, wherein the inlet pressure of the inlet stream is between about 500 psia and about 1000 psia.

11. The method according to claim 1, wherein the inlet pressure of the inlet stream is between about 900 psia and about 1,000 psia.

12. The method according to claim 1, further comprising the steps of:
combining more than one monomer in a mixture of monomers;
creating a block co-polyimide polymer; and
forming the block co-polyimide membrane from the block co-polyimide polymer by applying a solution casting method to the block co-polyimide polymer.

13. The method according to claim 12, wherein the more than one monomer is selected from the group consisting of: 6-FDA; mPDA; durene diamine; PTCDA; PMDA; BAPT; TBB; FDA; and ODA.

14. The method according to claim 13, wherein the mixture of monomers comprises 6-FDA, mPDA, and durene diamine.

15. The method according to claim 1, wherein the method further comprises the step of:
adjusting operating conditions of a system, the system comprising the block co-polyimide membrane, such that pure gas selectivity of the block co-polyimide membrane to helium relative to the methane is between about 50 and about 150.

16. The method according to claim 1, wherein the method further comprises the step of:
adjusting operating conditions of a system, the system comprising the block co-polyimide membrane, such that pure gas selectivity of the block co-polyimide membrane to $CO_2$ relative to the methane is between about 30 and about 60.

17. The method according to claim 15, wherein operating conditions of a system comprise the inlet pressure of the inlet stream.

18. The method according to claim 16, wherein the operating conditions of a system comprise the inlet pressure of the inlet stream.

19. The method according to claim 1, further comprising the step of improving performance of the block co-polyimide membrane with a chemical modification selected from the group consisting of: bromination of the block co-polyimide membrane; molecular weight increase of the block co-polyimide membrane; and modification with bulky diamine groups including 9,9-bis(4-aminophenyl)fluorine, 9,9-bis(4-aminophenyl-3-isopropyl-5-methyl-phenyl)fluorine, and 4,4'-methylene bis(2,6-diisopropylaniline).

20. The method according to claim 5, wherein a co-polyimide (6-FDA-mPDA)-(6-FDA-durene) block ratio is selected from the block ratios consisting of: (2500/15000); (15000/2500); (2500/2500); (5000/5000); (7500/7500); (10000/10000); (12500/12500); (15000/15000); and (20000/20000).

21. The method according to claim 5, wherein co-polyimide (6-FDA-mPDA)-(6-FDA-durene) block ratios comprise (5000/5000) and (15000/15000).

22. The method according to claim 19, wherein the method further comprises the step of:
adjusting operating conditions of a system, the system comprising a brominated block co-polyimide membrane, such that pure gas permeability of the brominated block co-polyimide membrane to $CO_2$ is about 115 barriers.

23. The method according to claim 19, wherein the method further comprises the step of:
adjusting operating conditions of a system, the system comprising a brominated block co-polyimide membrane, such that the pure gas permeability of the block co-polyimide membrane to He is about 110 barrers.

24. The method according to claim 1, wherein the method further comprises the step of:
adjusting operating conditions of a system, the system comprising a block co-polyimide membrane, such that mixed gas selectivity of the block co-polyimide membrane to $H_2S$ and $CO_2$ relative to methane are about 23 and 27, respectively.

* * * * *